US012798365B2

(12) United States Patent
Kim et al.

(10) Patent No.: US 12,798,365 B2
(45) Date of Patent: Nov. 17, 2026

(54) VEHICLE MOUNTING DEVICE FOR A LPG STORAGE TANK

(71) Applicants: HYUNDAI MOTOR COMPANY, Seoul (KR); KIA CORPORATION, Seoul (KR)

(72) Inventors: Chang Han Kim, Gwangju (KR); Seung Yup Oh, Incheon (KR); Man Seok Oh, Yongin-si (KR); Seung Hoon Choi, Seoul (KR); Gil Eon Kang, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 374 days.

(21) Appl. No.: 18/513,029

(22) Filed: Nov. 17, 2023

(65) Prior Publication Data

US 2024/0367507 A1 Nov. 7, 2024

(30) Foreign Application Priority Data

May 2, 2023 (KR) ........................ 10-2023-0056905

(51) Int. Cl.
*B60K 15/07* (2006.01)

(52) U.S. Cl.
CPC .................................... *B60K 15/07* (2013.01)

(58) Field of Classification Search
CPC .... B60K 15/063; B60K 15/067; B60K 15/07; B60K 2015/0634; B60K 2015/0638
See application file for complete search history.

(56) References Cited

U.S. PATENT DOCUMENTS

2005/0258630 A1* 11/2005 Choi .................... B60K 15/067 280/834
2006/0032532 A1* 2/2006 Suess .................... F17C 13/083 137/266
2006/0033322 A1* 2/2006 Suess ..................... B60K 15/07 280/830
2008/0023957 A1* 1/2008 Diehl ..................... B60K 15/07 280/834

(Continued)

FOREIGN PATENT DOCUMENTS

EP 2371604 A1 10/2011
GB 2160834 A * 1/1986 ........... B60K 15/063

(Continued)

OTHER PUBLICATIONS

JP H09109769 A—translation (Year: 1997).*

(Continued)

*Primary Examiner* — Jacob S. Scott
(74) *Attorney, Agent, or Firm* — Lempia Summerfield Katz LLC

(57) ABSTRACT

A vehicle storage tank mounting device configured to mount an LPG storage tank at the rear position of a vehicle body frame using a storage tank mounting frame so as to absorb or block collision impact, thereby avoiding interference with the vehicle body frame and a propeller shaft. The vehicle storage tank mounting device is further configured to reliably absorb or block collision impact transmitted to the storage tank in the event of a side collision and a rear collision, and to satisfy collision safety performance and vehicle laws.

13 Claims, 6 Drawing Sheets

(56) References Cited

U.S. PATENT DOCUMENTS

| | | | | |
|---|---|---|---|---|
| 2012/0025509 | A1* | 2/2012 | Hourai ................. | B60K 15/067<br>280/834 |
| 2012/0080466 | A1* | 4/2012 | Schultheis ............ | F17C 13/084<br>224/400 |
| 2022/0402355 | A1* | 12/2022 | Kim ..................... | B60K 15/067 |

FOREIGN PATENT DOCUMENTS

| | | | | | |
|---|---|---|---|---|---|
| JP | H09109769 | A | * | 4/1997 | |
| KR | 20100019617 | A | * | 2/2010 | ....... B60K 15/03006 |
| KR | 102006815 | B1 | | 8/2019 | |
| KR | 20200061544 | A | | 6/2020 | |
| KR | 20200065396 | A | * | 6/2020 | ............. B60K 15/07 |
| KR | 20230018059 | A | | 2/2023 | |
| KR | 102566575 | B1 | * | 8/2023 | ............. B60K 15/07 |
| LU | 101416 | B1 | * | 4/2021 | ........... B62D 25/087 |

OTHER PUBLICATIONS

KR 102566575 B1—translation (Year: 2023).*
KR 2010019617 A—translation (Year: 2010).*
LU 101416 B1 (Year: 2021).*
GB 2160834 A—translation (Year: 1986).*
KR 20200065396 A—translation (Year: 2020).*

* cited by examiner

- RELATED ART -

- RELATED ART -

- RELATED ART -

VEHICLE MOUNTING DEVICE FOR A LPG STORAGE TANK

CROSS-REFERENCE TO RELATED APPLICATION

This application claims, under 35 U.S.C. § 119(a), the benefit of priority to Korean Patent Application No. 10-2023-0056905, filed on May 2, 2023, the entire contents of which are incorporated herein by reference.

BACKGROUND

(a) Technical Field

The present disclosure relates to a vehicle mounting device for a liquefied petroleum gas (LPG) storage tank (e.g., bombe). More particularly, it relates to a vehicle mounting device for a LPG storage tank configured to mount the LPG storage tank on a vehicle body frame and to secure collision safety performance of the LPG storage tank.

(b) Background Art

In general, a vehicle using LPG fuel has a storage tank filled with LPG fuel and mounted at a predetermined location on the vehicle.

Particularly, a vehicle body frame of a small commercial vehicle (e.g., a small truck having a loading part) has various components mounted thereon. For example, the above-mentioned various components include a storage tank filled with LPG fuel and a driving system including an engine and a propeller shaft.

A description is given as to a conventional technique of mounting a liquefied petroleum gas (LPG) storage tank in a small commercial vehicle.

FIG. 1 is a side view showing a structure of the related art in which an LPG storage tank is mounted on a small commercial vehicle. FIGS. 2 and 3 are plan views showing an example in which the LPG storage tank is mounted on a vehicle body frame of the small commercial vehicle in the related art.

As shown in FIG. 1, a cylinder type storage tank 20, capable of being filled with LPG fuel, is mounted on a vehicle body frame 10 that supports a loading part 30 of the small commercial vehicle.

Accordingly, the cylinder type storage tank 20 mounted on the vehicle body frame 10 is located below the loading part 30 and is disposed in the longitudinal direction of the vehicle body.

More specifically, as shown in FIGS. 2 and 3, the vehicle body frame 10 is mounted with driving system components including an engine 11, a transmission 12, and a propeller shaft 13 connecting an output part of the transmission 12 to a rear axle for driving rear wheels 14 so as to transmit power therebetween. Particularly, the cylinder type storage tank 20 is mounted inside or outside one side of the vehicle body frame 10 and is disposed in the longitudinal direction of the vehicle body.

However, the storage tank mounting structure of the conventional small commercial vehicle has the following problems.

First, when the cylinder type storage tank 20 is mounted inside one side of the vehicle body frame 10, as shown in FIG. 2, it is necessary to secure a space configured to allow the storage tank 20 to be mounted therein. It is also desirable or necessary to prevent the storage tank 20 from interfering with peripheral components disposed around the storage tank 20, such as the propeller shaft 13, an exhaust pipe 15, and a transverse frame part 10-2 connecting longitudinal frame parts 10-1 of the vehicle body frame 10 to each other. Accordingly, there is a problem in that it is difficult to secure a mounting space for the cylinder type storage tank 20.

Further, since the cylinder type storage tank 20 is disposed in close proximity to the propeller shaft 13 or the exhaust pipe 15, there is a concern that the cylinder type storage tank 20 may contact the propeller shaft 13 or the exhaust pipe 15, which may limit the design specifications of the propeller shaft 13. In addition, due to the potential contact between the storage tank 20 and the propeller shaft 13, it is difficult to improve on the cylinder type storage tank 20, thus limiting a charging capacity of the cylinder type storage tank 20.

Second, when the cylinder type storage tank 20 is mounted outside one side of the vehicle body frame 10, as shown in FIG. 3, a safety concern arises due to the possibility of direct impact on the cylinder type storage tank 20 in the event of a side collision involving the vehicle.

Third, in order to absorb impact directly transmitted to the cylinder type storage tank 20 in the event of a side collision involving the vehicle, the inclusion of a protector designed to protect the cylinder type storage tank 20, its assembly parts, and related components may be desired. However, this approach could potentially lead to various problems such as an increase in the number of parts, an increase in cost, and an increase in weight.

Fourth, if a small commercial vehicle's cabin is designed as a double cabin including a rear seat in addition to a front seat, the increased cabin size may cause an interference problem in where the rear end of the cabin comes into contact with the front end of the cylinder type storage tank.

The above information disclosed in this Background section is only to enhance understanding of the background of the disclosure. Therefore, the Background section may contain information that does not form the prior art that is already known to a person of ordinary skill in the art.

SUMMARY

The present disclosure has been made in an effort to solve the above-described problems associated with the prior art. It is an object of the present disclosure to provide a vehicle mounting device for a liquefied petroleum gas (LPG) storage tank. The mounting device is configured to mount the LPG storage tank at a rear position of a vehicle body frame using a storage tank mounting frame and the like so as to absorb or block an impact from a collision. Thus, the vehicle mounting device for a LPG storage tank makes it possible not only to avoid interference with a transverse frame part of the vehicle body frame and a propeller shaft, but also to reliably absorb or block collision impact directly transmitted to the storage tank in the event of a side collision and a rear collision. Accordingly, it is possible to provide a vehicle mounting device for a LPG storage tank that satisfies collision safety performance and vehicle laws.

In one aspect, the present disclosure provides a vehicle storage tank mounting device including a storage tank mounting frame to be mounted at a rear position of a vehicle body frame. The mounting device also includes a mounting bracket mounted on the storage tank mounting frame. The mounting device also includes a LPG storage tank mounted on the mounting bracket and disposed in a space below the storage tank mounting frame so as to be protected from collision. In another aspect, the present disclosure provides a vehicle including the storage tank mounting device.

In various aspects of the disclosure, the storage tank mounting frame may include two or more first mounting frame parts configured to connect longitudinal frames parts to each other. The longitudinal frame parts of the storage tank mounting frame may be respectively disposed on opposite sides of the vehicle body frame, and respectively disposed on a left side and a right side of the vehicle body frame. The storage tank mounting frame also includes at least two or more second mounting frame parts configured to connect the first mounting frame parts to each other. The two or more second mounting frame parts of the storage tank mounting frame may also be respectively disposed on a front side and a rear side.

In various aspects of the disclosure, one of the first mounting frame parts may have a "C"-shaped bent portion formed or configured to avoid interference with a fuel pump mounted on an upper portion of the LPG storage tank.

In various aspects of the disclosure, the first mounting frame may have at least two mounting brackets configured to mount the LPG storage tank and mounted on the first mounting frame at predetermined intervals.

In various aspects of the disclosure, the LPG storage tank may have mounting plates formed or provided thereon. Each of the mounting plates may be integrally formed at a corresponding one of four sides of an upper portion of the LPG storage tank and may be assembled in close contact with a corresponding one of the mounting brackets.

In various aspects of the disclosure, the LPG storage tank mounted on the mounting brackets may be configured to be disposed at a rear position of a rear axle so as to avoid interference with a propeller shaft.

In various aspects of the disclosure, the LPG storage tank may be a doughnut-shaped circular tank having a predetermined height.

In various aspects of the disclosure, the LPG storage tank may be configured to be mounted on a vehicle body frame that has a step-and-protection frame mounted at a rear end thereof and that may be configured to protect a lower portion of the LPG storage tank from a rear collision.

In various aspects of the disclosure, the step-and-protection frame may include a pair of support frame parts formed to extend downward, via a middle portion in a height direction of the LPG storage tank, and to extend from the rear end of the vehicle body frame to a predetermined position so as to cover the lower portion of the LPG storage tank. The step-and-protection frame may also include a step frame part configured to connect lower ends of the support frame parts to each other.

In various aspects of the disclosure, a distance from a rear end of the LPG storage tank to the rear end of the vehicle body frame and a distance from the rear end of the LPG storage tank to a rear end of the support frame parts may be set to a predetermined set distance or more so as to prevent impact caused by a rear colliding body from being transmitted to the LPG storage tank and to prevent the rear colliding body from contacting the LPG storage tank.

In various aspects of the disclosure, the vehicle body frame may have a loading deck mounted thereon. The loading deck may have a guard frame disposed at a rear end thereof and may be formed to extend downwards so as to protect an upper portion of the LPG storage tank from a rear collision.

In various aspects of the disclosure, the guard frame may be formed to extend downward to a predetermined position so as to cover a rear end of the vehicle body frame and to protect the upper portion of the LPG storage tank.

Other aspects and embodiments of the disclosure are discussed below.

It should be understood that the terms "vehicle," "vehicular," and other similar terms as used herein are inclusive of motor vehicles in general. Such motor vehicles may include sport utility vehicles (SUVs), buses, trucks, various commercial vehicles, watercraft including a variety of boats and ships, aircraft, and the like. Such motor vehicles may also include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, e.g., vehicles powered by both gasoline and electricity.

The above and other features of the disclosure are discussed below.

BRIEF DESCRIPTION OF THE DRAWINGS

The above and other features of the present disclosure are described in detail with reference to certain embodiments thereof illustrated in the accompanying drawings, which are given hereinbelow by way of illustration only, and thus are not limitative of the present disclosure, and wherein.

Figure 1:
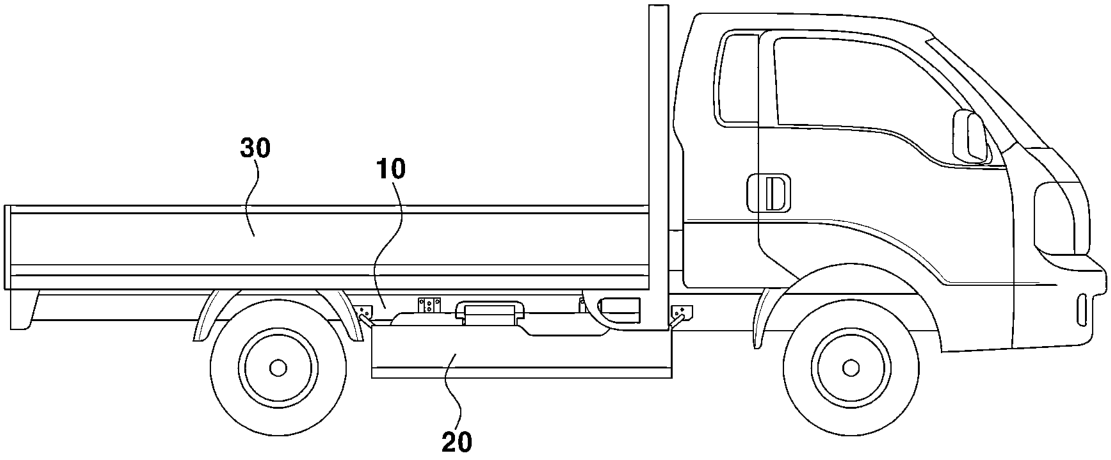
FIG. 1 is a side view showing a structure of the related art in which an LPG storage tank is mounted on a small commercial vehicle.
Figure 2:
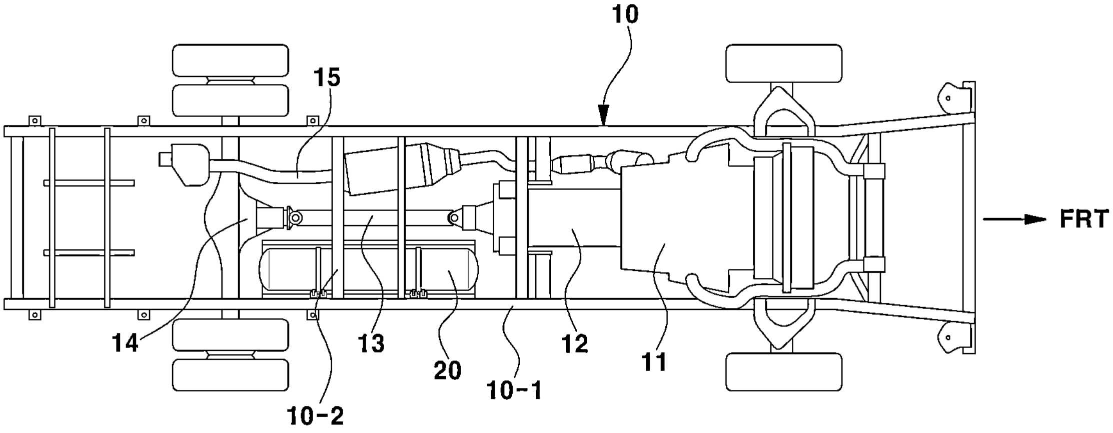
FIGS. 2 and 3 are plan views showing an example in which the LPG storage tank is mounted on a vehicle body frame of the small commercial vehicle in the related art.
Figure 3:
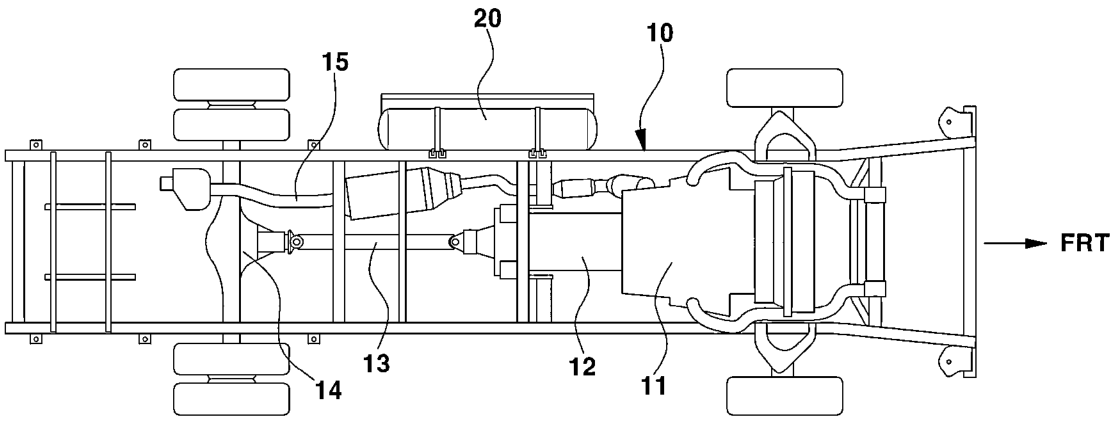

It should be understood that the appended drawings are not necessarily drawn to scale, thus present a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference is made in detail to various embodiments of the present disclosure, examples of which are illustrated in the accompanying drawings and described below.

Specific structural or functional descriptions made in connection with the embodiments of the present disclosure are merely illustrative for the purpose of describing embodiments according to the concept of the present disclosure. Additionally, the embodiments according to the concept of the present disclosure may be implemented in various forms. Further, it should be understood that the present description is not intended to limit the disclosure to the embodiments. On the contrary, the disclosure is intended to cover not only the embodiments, but also various alternatives, modifications, equivalents, and other embodiments, which may be included within the spirit and scope of the disclosure as defined by the appended claims.

In the present disclosure, terms such as "first" and/or "second" may be used to describe various components, but the components are not limited by the terms. The terms are used only for the purpose of distinguishing one component from other components. For example, a first component may be referred to as a second component, and similarly, a second component may also be referred to as a first component without departing from the scope of rights according to the concept of the present disclosure.

When one component is referred to as being "connected" or "joined" to another component, the one component may be directly connected or joined to the other component, but it should be understood that other components may be present therebetween. On the other hand, when the one component is referred to as being "directly connected to" or "directly in contact with" the other component, it should be understood that other components are not present therebetween. Other expressions for describing relationships between components, such as, "between" and "directly between" or "adjacent to" and "directly adjacent to", should be interpreted in the same manner.

When a component, device, element, or the like of the present disclosure is described as having a purpose or performing an operation, function, or the like, the component, device, or element should be considered herein as being "configured to" meet that purpose or perform that operation or function.

The same reference numerals represent the same components throughout the specification. Additionally, the terms in the specification are used merely to describe embodiments and are not intended to limit the present disclosure. In this specification, an expression in a singular form also includes a plural form, unless clearly specified otherwise in context. As used herein, expressions such as "comprise" and/or "comprising" do not exclude the presence or addition of one or more components, steps, operations, and/or elements other than those described.

Hereinafter, embodiments of the present disclosure are described in detail with reference to the accompanying drawings.

Figure 4:
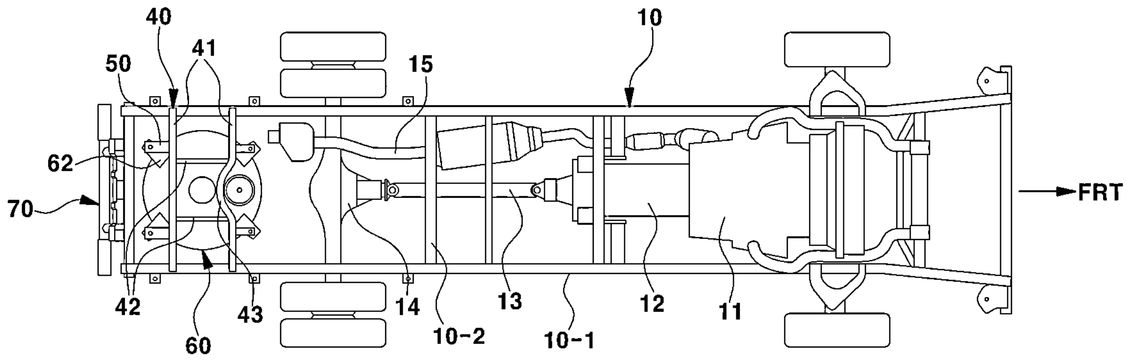
FIG. 4 is a plan view showing a vehicle mounting device for an LPG storage tank according to the present disclosure.

FIG. 4 is a plan view showing a vehicle mounting device for a liquefied petroleum gas (LPG) storage tank according to the present disclosure. Reference numeral 10 indicates a vehicle body frame.

The vehicle body frame 10 supports a cabin for a driver's seat and a loading part of a small commercial vehicle. The vehicle body frame 10 is also provided to mount various driving system parts thereon. The vehicle body frame 10 includes longitudinal frame parts 10-1 disposed in two rows in the longitudinal direction (e.g., lengthwise direction) of a vehicle and a plurality of transverse frame parts 10-2 connecting the longitudinal frames 10-1 to each other. The plurality of transverse frame parts 10-2 are disposed in the transverse or lateral direction (e.g., widthwise direction) of the vehicle.

In addition, as shown in FIG. 4, the vehicle body frame 10 has various driving system parts mounted thereon, such as an engine 11, a gearbox 12, and a propeller shaft 13. The propeller shaft 13 connects an output part of the transmission (e.g., gearbox) 12 to a rear axle for driving the rear wheels 14 so as to transmit power therebetween.

Particularly, in the case of a small commercial truck using LPG fuel, a LPG storage tank filled with LPG fuel is also mounted on the vehicle body frame 10.

However, as described above, since the conventional cylinder type storage tank is mounted inside or outside one side of the vehicle body frame 10, the cylinder type storage tank may interfere with the propeller shaft 13, the exhaust pipe 15, and/or a transverse frame part 10-2 of the vehicle body frame 10. In addition, an issue may occur as an impact resulting from a side collision directly transmitted to the cylinder type storage tank, potentially leading to a safety incident.

In order to solve the above-described problems, the present disclosure provides a vehicle mounting device for an LPG storage tank configured to mount the LPG storage tank at a predetermined position so as to avoid interference with a propeller shaft, an exhaust pipe, and a transverse frame of a vehicle body frame. Additionally, the present disclosure provides a vehicle mounting device for an LPG storage tank configured to reliably absorb or block impact in the event of a side collision or a rear collision.

To this end, as shown in FIG. 4, a storage tank mounting frame 40 is configured to be mounted at the rear position of the vehicle body frame 10 by welding or the like. A mounting bracket 50, configured to mount an LPG storage tank 60 thereon, is mounted on the storage tank mounting frame 40 via welding or the like. In one example, the mounting bracket 50 may include multiple such brackets, such as four mounting brackets 50 as shown.

Figure 5:
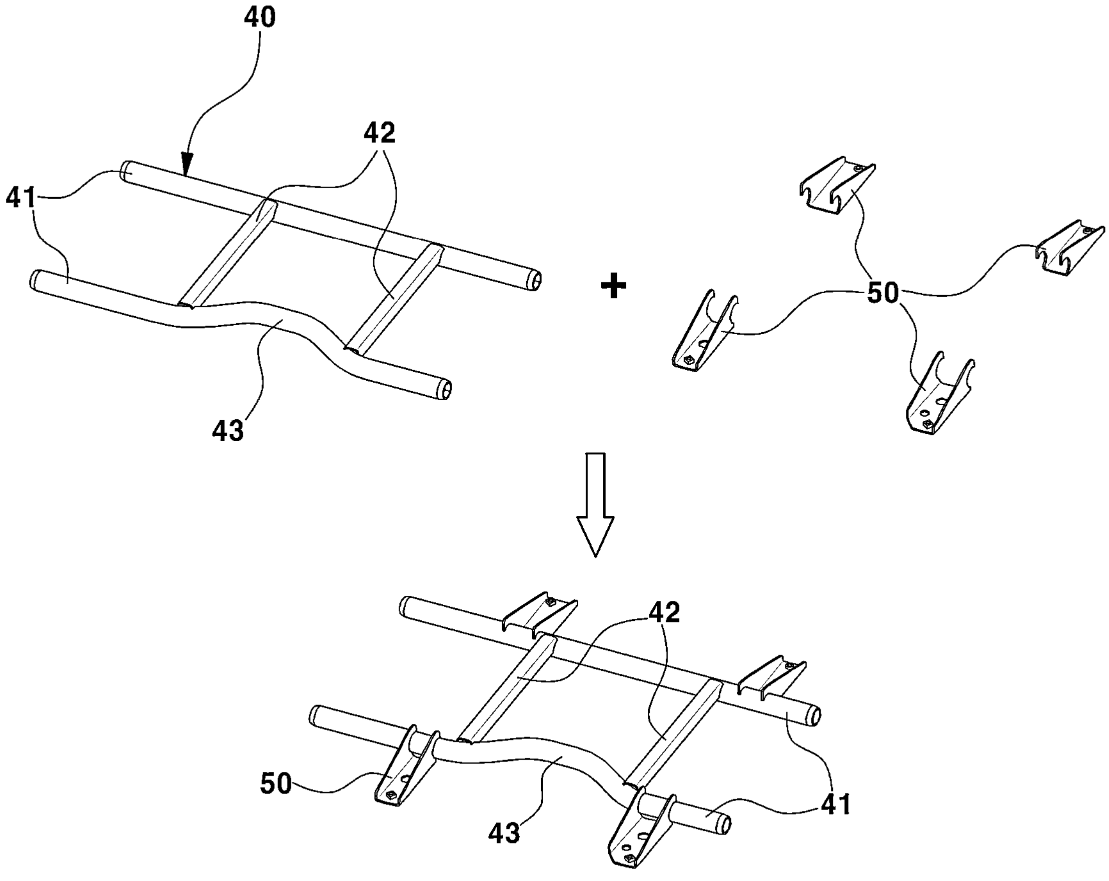
FIG. 5 is a perspective view showing a storage tank mounting frame and a mounting bracket of the vehicle mounting device for the LPG storage tank according to the present disclosure.
Figure 6:
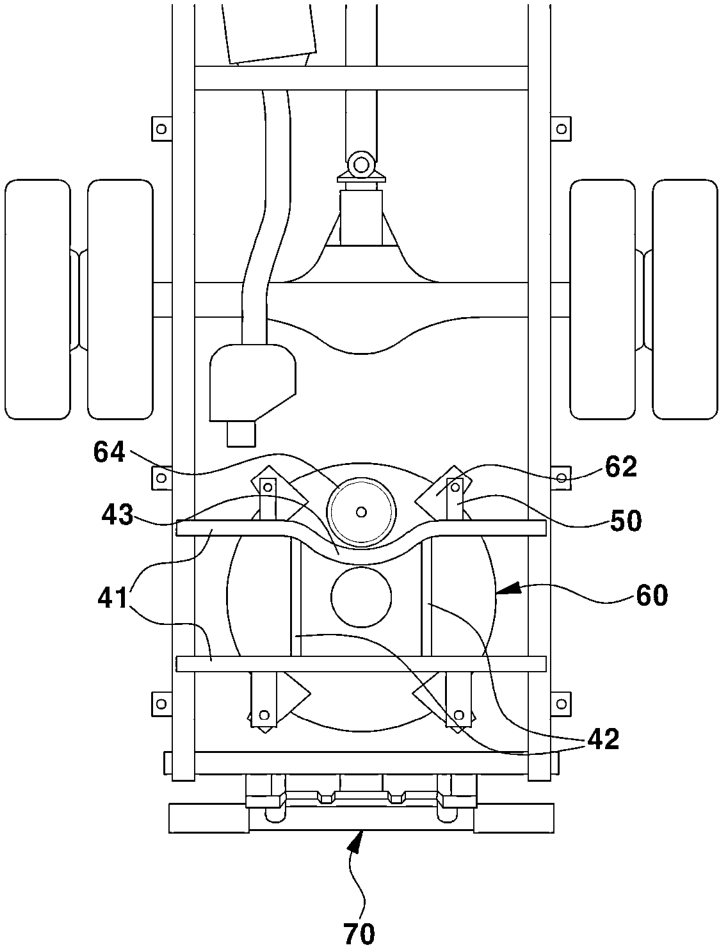
FIG. 6 is an enlarged plan view of a main part showing a state in which the LPG storage tank is mounted at the rear of the vehicle body frame by the storage tank mounting frame and the mounting bracket shown in FIG. 5.

As shown in FIGS. 5 and 6, the storage tank mounting frame 40 includes two or more first mounting frame pars 41 that are configured to connect the longitudinal frame parts 10-1 disposed on the opposite sides of the vehicle body frame 10 to each other. The longitudinal frame parts 10-1 are respectively disposed on the left side and the right side of the vehicle body frame 10. The storage tank mounting frame 40 also includes two or more second mounting frame parts 42 that are configured to connect the first mounting frame parts 41 to each other. The first mounting frame parts 41 are respectively disposed on a front side and a rear side.

In addition, the mounting brackets 50 are provided to mount the LPG storage tank 60 on the storage tank mounting frame 40. Two or more of the mounting brackets 50 may be mounted at predetermined intervals on the first mounting frame parts 41.

In this case, the first mounting frame parts 41 and the second mounting frame parts 42 of the storage tank mounting frame 40 and the mounting brackets 50 are arranged in the "#" shape or intersecting grid shape to prevent buckling when viewed from above.

The LPG storage tank 60 may be provided as a doughnut-shaped circular storage tank having a predetermined height. Mounting plates 62 are formed to be respectively integrated with four sides of the upper portion of the LPG storage tank 60. The mounting plates 62 are respectively in close contact (e.g., connected) with the mounting brackets 50 and are assembled thereto by welding or the like.

Therefore, each mounting plate 62 of the LPG storage tank 60 is assembled to a respective one of the mounting brackets 50 by welding or the like, thereby allowing the LPG storage tank 60 to be disposed in a space below the storage tank mounting frame 40 so as to be protected from a side collision and a rear collision.

Furthermore, each mounting plate 62 of the LPG storage tank 60 is assembled to each mounting bracket 50 by welding or the like. This configuration allows the LPG storage tank 60 to be safely disposed at a position behind the rear axle 14 where interference with peripheral parts such as the exhaust pipe 15 and the propeller shaft 13 does not occur.

In this case, as shown in FIGS. 5 and 6, one of the first mounting frame parts 41 of the storage tank mounting frame 40 is formed with a "C"-shaped bent portion 43, as viewed from above, to avoid interference with a fuel pump 64 mounted on the upper portion of the LPG storage tank 60. The fuel pump 64 is formed to protrude upwards from the upper portion of the LPG storage tank 60.

Therefore, the fuel pump 64 mounted on the upper portion of the LPG storage tank 60 may be disposed to protrude upwards via the "C"-shaped bent portion 43 formed on one of the first mounting frame parts 41. As a result, the configuration makes it possible to reliably prevent the fuel pump 64 from contacting the first mounting frame part 41 when each mounting plate 62 of the LPG storage tank 60 is assembled to each mounting bracket 50, respectively.

In addition, since the fuel pump 64 of the LPG storage tank 60 is disposed to protrude upward because of the "C"-shaped bent portion 43 of the first mounting frame part 41, the disposition height of the LPG storage tank 60 may be increased by the protruding length of the fuel pump 64. As a result, the ground clearance of the LPG storage tank 60 (e.g., distance from the ground to the bottom surface of the LPG storage tank) is substantially increased or maximized.

As described above, the ground clearance of the LPG storage tank 60 is maximally adjusted, thereby preventing the LPG storage tank 60 from being damaged.

For example, the increased ground clearance prevents the bottom surface of the LPG storage tank 60 from contacting the ground and being scratched while a vehicle travels on a slope, and also prevents the LPG storage tank 60 from contacting a specific protruding object on the ground.

Figure 7:
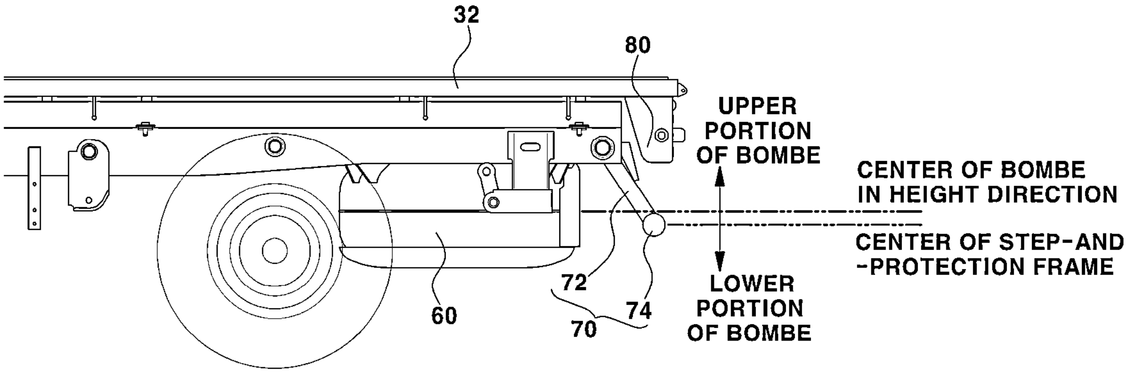
FIG. 7 is a side view showing the vehicle mounting device for the LPG storage tank according to the present disclosure.

As shown in FIG. 7, a step-and-protection frame 70 is mounted at the rear end of the vehicle body frame 10. The step-and-protection frame 70 is configured to protect the lower portion of the LPG storage tank 60 from a rear collision. In addition, a guard frame 80 is configured to protect the upper portion of the LPG storage tank 60 from a rear collision. The guard frame 80 is disposed at the rear end of a loading deck 32, which is a bottom plate of the loading part 30 mounted on the vehicle body frame 10. The guard frame 80 is also formed to extend downwards from the loading deck 32.

As shown in FIGS. 6 and 7, the step-and-protection frame 70 may include a pair of support frames 72 that are formed to extend downwards to a middle portion in the height direction of the LPG storage tank 60. The pair of support frames 72 extend from the rear end of the vehicle body frame 10 to a predetermined position so as to cover (e.g., shield) the lower portion of the LPG storage tank 20. The pair of support frames 72 may be vertically disposed in the upward-and-down direction or may be disposed or oriented obliquely toward the rear side. Additionally, the step-and-protection frame 70 may include a step frame 74 that is configured to connect the lower ends of the support frames 72 to each other and to be used as a foothold when an operator enters and exits the loading part.

A distance from the rear end of the LPG storage tank 60 to the rear end of the vehicle body frame 10 and a distance from the rear end of the LPG storage tank 60 to the rear end of the support frame 72 may be set to a predetermined set distance (e.g., 150 mm) or more. As a result, the configuration makes it possible not only to prevent a collision impact of a colliding body approaching from the rear side (e.g., a trailing vehicle, an obstacle, or the like) from being transmitted to the LPG storage tank 60, but also to prevent direct contact between the above-mentioned colliding body and the LPG storage tank 60.

Figure 9:
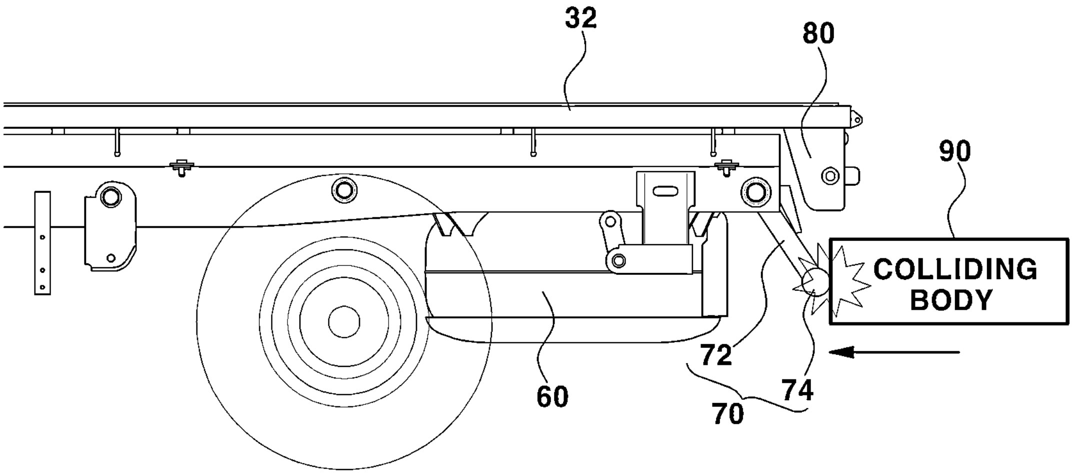
FIGS. 9 and 10 are side views showing an example in which the lower portion of the LPG storage tank is protected in the event of a rear collision between a rear colliding body and a step-and-protection frame of the vehicle mounting device for the LPG storage tank according to the present disclosure.
Figure 10:
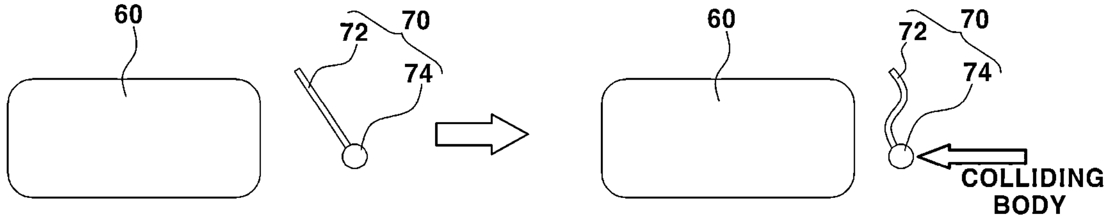

Therefore, as shown in FIGS. 9 and 10, in the event of a rear collision in which a rear colliding body 90 first collides with the step-and-protection frame 70, the step-and-protection frame 70 is deformed (e.g., undergoes controlled deformation) so as to absorb, in advance, an impact caused by the collision of the rear colliding body 90.

The impact caused by the collision of the rear colliding body 90 is otherwise transmittable to the lower portion of the LPG storage tank 60. As a result, the step-and-protection frame 70 prevents the rear colliding body 90 from directly colliding with the lower portion of the LPG storage tank 60. Accordingly, the LPG storage tank 60 may be safely protected from impact caused by a rear collision.

As shown in FIG. 7, the guard frame 80 is formed to extend downwards to a predetermined position so as to cover the rear end of the vehicle body frame 10. Accordingly, the guard frame 80 protects the upper portion of the LPG storage tank 60, i.e., prevents impact caused by a rear collision from being transmitted to the upper portion of the LPG storage tank 60.

Figure 8:
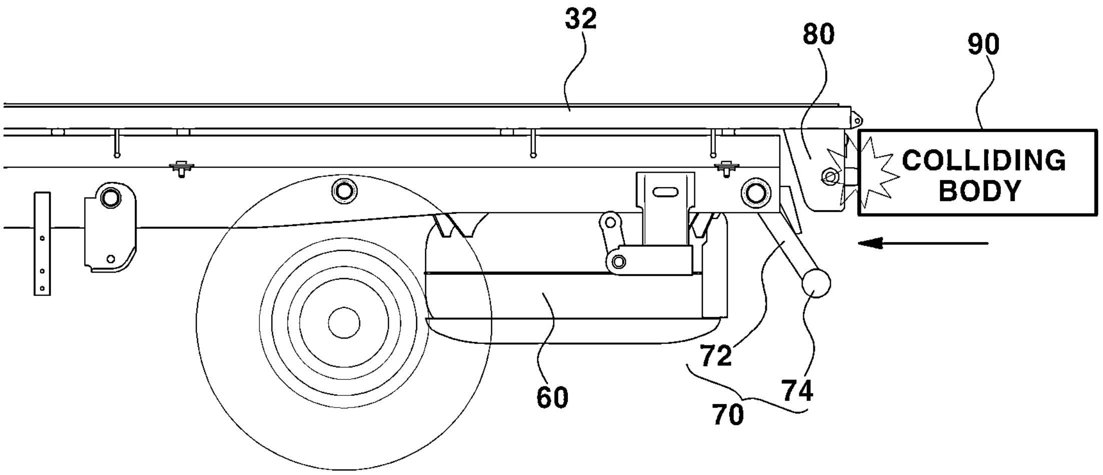
FIG. 8 is a side view showing an example in which the upper portion of the LPG storage tank is protected in the event of a rear collision between a rear colliding body and a guard frame of the vehicle mounting device for the LPG storage tank according to the present disclosure.

Therefore, as shown in FIG. 8, in the event of a rear collision in which the guard frame 80 first collides with the rear colliding body 90, the guard frame 80 is deformed so as to absorb, in advance, an impact caused by the collision of the rear colliding body 90. The impact caused by the collision of the rear colliding is otherwise transmittable to the upper portion of the LPG storage tank 60. Therefore, the guard frame 80 prevents the rear colliding body 90 from directly colliding with the upper portion of the LPG storage tank 60. Accordingly, the LPG storage tank 60 may be safely protected from impact caused by a rear collision.

As is apparent from the above description, the present disclosure provides the following effects.

First, an LPG storage tank is mounted at the rear portion of a vehicle body frame using a storage tank mounting frame. As a result, the configuration makes it possible to reliably mount the LPG storage tank at a location where there is no interference with peripheral parts such as a propeller shaft, an exhaust pipe, and a transverse frame of the vehicle body frame.

Second, the LPG storage tank is mounted at the rear portion of the vehicle body frame. Accordingly, even if a cabin of a small commercial truck is a double cabin, it is possible to prevent any interference between the cabin and the LPG storage tank due to an increase in cabin size.

Third, the LPG storage tank is provided as a doughnut-shaped circular storage tank, and is disposed in a space behind a rear axle and below the rear end of the vehicle body frame. Accordingly, the LPG storage tank may be reliably protected from a side collision with respect to the side portion of the vehicle body frame.

Fourth, a step-and-protection frame is installed at the rear end of the vehicle body frame, and a guard frame is mounted on a loading deck of the vehicle body frame. Thus, the configuration enables the guard frame, when in contact with a rear colliding body in the event of a rear collision, to absorb or block impact transmitted to the upper portion of the LPG storage tank. This configuration also enables the step-and-protection frame, when in contact with a rear colliding body in the event of a rear collision, to absorb or block impact transmitted to the lower portion of the LPG storage tank. Accordingly, it is possible to satisfy collision safety performance and vehicle laws that safely protect the LPG storage tank from a rear collision.

Although the embodiments of the present disclosure have been described in detail above, the scope of the present disclosure is not limited thereto. Various modifications and improvements made by those having ordinary skill in the art using the basic technical concept of the present disclosure defined in the following claims are also included in the scope of the present disclosure.

What is claimed is:

1. A vehicle storage tank mounting device comprising:

a storage tank mounting frame configured to be mounted at a rear position of a vehicle body frame;

a mounting bracket mounted on the storage tank mounting frame; and a liquified petroleum gas (LPG) storage tank mounted on the mounting bracket and disposed in a space below the storage tank mounting frame to be protected from collision, wherein the storage tank mounting frame has a "C"-shaped bent portion configured to avoid interference with a fuel pump mounted on an upper portion of the LPG storage tank.

2. The vehicle storage tank mounting device of claim 1, wherein the storage tank mounting frame comprises:

at least two first mounting frame parts configured to connect longitudinal frame parts to each other, the longitudinal frame parts being disposed on opposite sides of the vehicle body frame, and disposed on a left side and a right side of the vehicle body frame; and at least two second mounting frame parts configured to connect the first mounting frame parts to each other and disposed on a front side and a rear side of the first mounting frame parts.

3. The vehicle storage tank mounting device of claim 2, wherein one of the first mounting frame parts includes the "C"-shaped bent portion.

4. The vehicle storage tank mounting device of claim 2, wherein the mounting bracket includes at least two mounting brackets and wherein the at least two mounting brackets are mounted on the first mounting frame parts at predetermined intervals and configured to mount the LPG storage tank.

5. The vehicle storage tank mounting device of claim 4, wherein the LPG storage tank has mounting plates formed thereon, and wherein each of the mounting plates is integrally formed at a corresponding one of four sides of an upper portion of the LPG storage tank and is assembled in close contact with a corresponding one of the at least two mounting brackets.

6. The vehicle storage tank mounting device of claim 1, wherein the LPG storage tank mounted on the mounting bracket is configured to be disposed at a rear position of a rear axle of the vehicle body frame to avoid interference with a propeller shaft connected to an output part of a transmission of the vehicle.

7. The vehicle storage tank mounting device of claim 6, wherein the LPG storage tank is a doughnut-shaped circular storage tank having a predetermined height.

8. The vehicle storage tank mounting device of claim 1, wherein the vehicle storage tank mounting device is mounted to a vehicle including the vehicle body frame, wherein the vehicle body frame has a step-and-protection frame mounted at a rear end thereof, and wherein the step-and-protection frame is configured to protect a lower portion of the LPG storage tank from rear collision.

9. The vehicle storage tank mounting device of claim 8, wherein the step-and-protection frame comprises:

a pair of support frames formed to extend downward to a middle portion in a height direction of the LPG storage tank from the rear end of the vehicle body frame to a predetermined position so as to cover the lower portion of the LPG storage tank; and a step frame configured to connect lower ends of the support frames to each other.

10. The vehicle storage tank mounting device of claim 9, wherein a distance from a rear end of the LPG storage tank to the rear end of the vehicle body frame and a distance from the rear end of the LPG storage tank to a rear end of the support frame are set to a predetermined set distance or more to prevent impact with a rear colliding body from being transmitted to the LPG storage tank and to prevent the rear colliding body from contacting the LPG storage tank.

11. The vehicle storage tank mounting device of claim 1, wherein the vehicle storage tank mounting device is mounted to a vehicle including the vehicle body frame, wherein the vehicle body frame has a loading deck mounted thereon, and wherein the loading deck has a guard frame disposed at a rear end thereof that extends downward to protect an upper portion of the LPG storage tank from a rear collision.

12. The vehicle storage tank mounting device of claim 11, wherein the guard frame extends downward to a predetermined position to cover a rear end of the vehicle body frame and protect the upper portion of the LPG storage tank.

13. A vehicle comprising:

a vehicle body frame; and a mounting device for a liquified petroleum gas (LPG) storage tank, wherein the mounting device includes a storage tank mounting frame mounted at a rear position of the vehicle body frame, a plurality of mounting brackets mounted on the storage tank mounting frame, and the LPG storage tank mounted on the plurality of mounting brackets and disposed in a space below the storage tank mounting frame to be protected from collision, wherein the storage tank mounting frame includes at least two first mounting frame parts configured to connect longitudinal frame parts to each other, the longitudinal frame parts being disposed on opposite sides of the vehicle body frame, and disposed on a left side and a right side of the vehicle body frame, and at least two second mounting frame parts configured to connect the first mounting frame parts to each other and disposed on a front side and a rear side of the first mounting frame parts, wherein the mounting bracket includes at least two mounting brackets, and wherein the at least two mounting brackets are mounted on the first mounting frame parts at predetermined intervals and configured to mount the LPG storage tank.

* * * * *